United States Patent

[11] 3,559,883

| [72] | Inventors | Francis P. Buiting<br>Plainville;<br>Joseph W. Waseleski, Jr., Mansfield, Mass. |
|---|---|---|
| [21] | Appl. No. | 803,861 |
| [22] | Filed | Mar. 3, 1969<br>Division of Ser. No. 641,027, May 24, 1967,<br>Pat. No. 3,474,963. |
| [45] | Patented | Feb. 2, 1971 |
| [73] | Assignee | Texas Instruments Incorporated<br>Dallas, Tex.<br>a corporation of Delaware |

[54] TEMPERATURE CONTROL
6 Claims, 10 Drawing Figs.

[52] U.S. Cl. ............................................... 236/68,
73/362; 219/505; 236/78; 331/66;
[51] Int. Cl. ............................................... G05d 23/24
[50] Field of Search ........................................ 236/78,
78n, 68, 75; 331/66, 176, 107; 251/11; 307/310;
317/132; 219/494, 504, 505X; 73/362

[56] References Cited
UNITED STATES PATENTS

| 2,487,279 | 11/1949 | Stalhane | 331/107 |
| 2,950,448 | 8/1960 | Finkel et al. | 331/176X |
| 2,984,729 | 5/1961 | Hykes et al. | 219/494X |
| 3,071,676 | 1/1963 | Van Sandwyk | 219/504X |
| 3,246,258 | 4/1966 | Boreen | 331/176X |

Primary Examiner—William E. Wayner
Attorneys—Harold Levine, Edward J. Connors, Jr., John A. Haug, James P. McAndrews and Gerald B. Epstein ABSTRACT: The apparatus disclosed herein proportionally controls a gas-burning heating system to maintain a zone to which heat is supplied at a predetermined temperature level. The flow of gas is varied by a valve the setting of which is adjusted by means of an electrically energized, thermal expansion actuator. A thermistor is provided for sensing the temperature in the controlled zone and the actuator is energized according to a predetermined function of the resistance of the thermistor thereby to maintain the temperature in the zone at the predetermined level.

3,559,883

Francis P. Buiting and
Joseph W. Waseleski, Jr.,
Inventors.
John C. Haug
Attorneys.

PATENTED FEB 2 1971   3,559,883

FIG. 8.
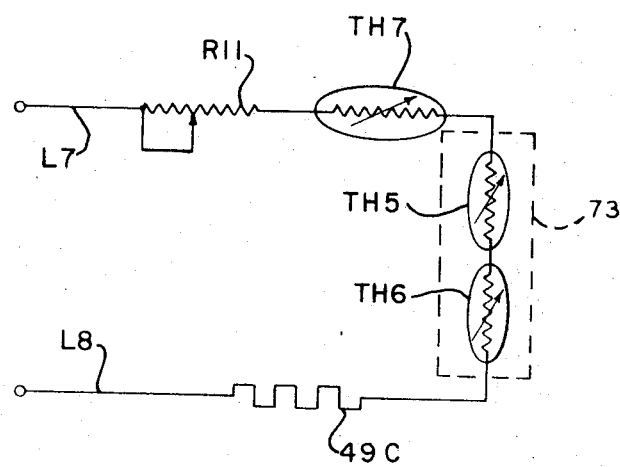
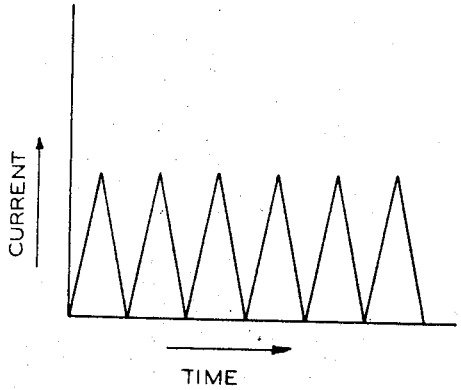
FIG. 9A.
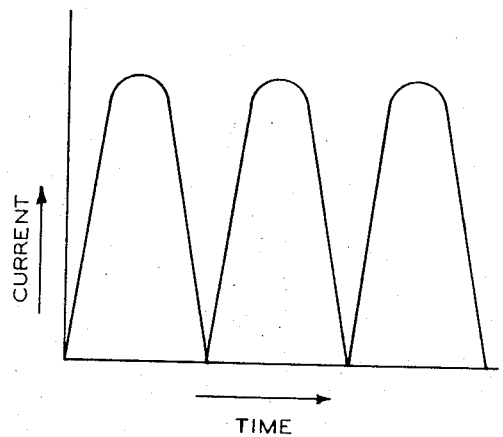
FIG. 9B.

TEMPERATURE CONTROL

This case is a division of application number 641,027, filed May 24, 1967, now U.S. Pat. No. 3,474,963 issued Oct. 28, 1969.

This invention relates to a temperature controller and more particularly to such a control which provides proportional control of heat flow relative to a zone to maintain the temperature of the zone at a predetermined level.

In most residential gas heating systems available heretofore, the controlling thermostat operates in an on-off mode and the burner therefore generates either maximum heat or no heat at all. Since such an on-off thermostat must, in order to be stable, have some differential or hysteresis between the turn-on and turn-off points and since there will inherently be some delay before heat provided by the burner affects the thermostat, such conventional controls normally produce a continual fluctuation or oscillation of the actual temperature around the desired set point.

Among the several objects of the present invention may be noted the provision of a temperature control system which exercises proportional control; the provision of such a control which will maintain the temperature in a given zone at a predetermined level without continual fluctuation; the provision of such a control which will maintain a desired temperature within close tolerance; the provision of a temperature control for a fuel-burning heating system which exercises proportional control over the heat produced by the burner; the provision of such a control which is highly reliable; and the provision of such a control which is exceptionally simple and inexpensive. Other objects and features will be in part apparent and in part pointed out hereinafter.

Briefly, a temperature control according to the present invention is adapted to control a system in which heat flow relative to a given zone is controllable by varying the flow of a fluid, such as fuel supplied to a burner. Valve means are provided which include an electrical actuator for portionally varying the rate of fluid flow according to a predetermined function of the degree of energization of the actuator. A thermistor senses the temperature in the zone and circuit means interconnecting the thermistor and the actuator are provided for proportionally varying the energization of the actuator according to a predetermined function of the resistance of the thermistor thereby to maintain the temperature in the zone at a predetermined level.

The invention accordingly comprises the constructions hereinafter described, the scope of the invention being indicated in the following claims.

In the accompanying drawings in which several of various possible embodiments of the invention are illustrated, FIG. 1 is a diagrammatic illustration of a heating system including a temperature control according to this invention;

FIG. 8 is a schematic circuit diagram of a further embodiment of a temperature control of this invention employing an electrothermal oscillator; and FIGS. 9A and 9B are graphs representing the behavior with time of the current flowing through the electrothermal oscillator of FIG. 8.

Corresponding reference characters indicate corresponding parts throughout the several views of the drawings.

Figure 1:
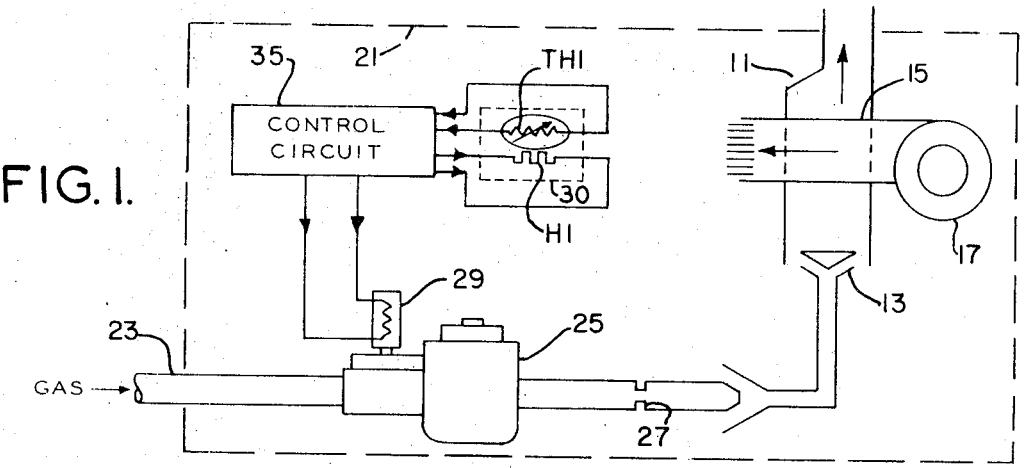

Referring now to FIG. 1 there is indicated generally at 11 a gas-fired, forced hot air furnace which may for example comprise a conventional residential heating unit. Furnace 11 includes a gas burner 13, a heat exchanger 15 and a blower 17 for forcing air through heat exchanger 15 to pick up heat from the burner flame. The heated air is then circulated through the zone which is to be heated. This zone is indicated generally at 21 and may for example comprise the interior of a residential structure. The rate at which heat is supplied to this zone can be controlled over a predetermined range by varying the burner flame, for example, by varying the amount of gas supplied thereto, thereby to maintain the temperature of this zone at a predetermined level.

Gas is provided to burner 13 from a gas main 23 through a pressure regulating valve 25. Burner 13 includes a metering orifice as indicated diagrammatically at 27 and thus the rate of flow of gas to the burner flame varies as a function of the pressure at which gas is provided to the metering orifice. Pressure regulating valve 25 is of conventional construction and in the example illustrated is of the force-balance type in which the outlet pressure is readily adjustable by means of a movable control member or arm within the valve. Such valves are normally sold by various commercial sources equipped with an adjustment screw which bears against the control member, by means of which screw the valve output pressure may be adjusted. In the control illustrated in FIG. 1, the adjustment screw assembly has been replaced with a thermal expansion actuator indicated generally at 29 having an output member or plunger the displacement or position of which varies as a function of the electrical energization of the actuator. The plunger or other operating member of actuator 29 bears against the valve control member so that the valve setting and hence the outlet pressure varies as a function of the energization of the actuator.

Positioned within the heated zone 21 is a sensing thermistor TH1 which responds to changes in the ambient temperature within the zone. A heater H1 is positioned in heat exchange relationship to thermistor TH1 for applying a preselectable thermal bias to the thermistor thereby to vary its temperature with respect to that in zone 21. As is explained in greater detail hereinafter, thermistor TH1 and heater H1 together comprise a solid state thermostat 30 for controlling the temperature in the zone 21. Thermistor TH1 and heater H1 are interconnected with a control circuit 35 which variably energizes actuator 29 according to a predetermined function of the resistance of the thermistor thereby to maintain the temperature within the zone 21 at a preselected level. Variations in the energization of actuator 29 produce corresponding changes in the gas pressure and in the amount of heat produced and each of these parameters varies substantially in accordance with a respective monotonic or single-valued function of the resistance of thermistor. Accordingly, the mode of operation obtained is that conventionally referred to as proportional control.

Figure 3:
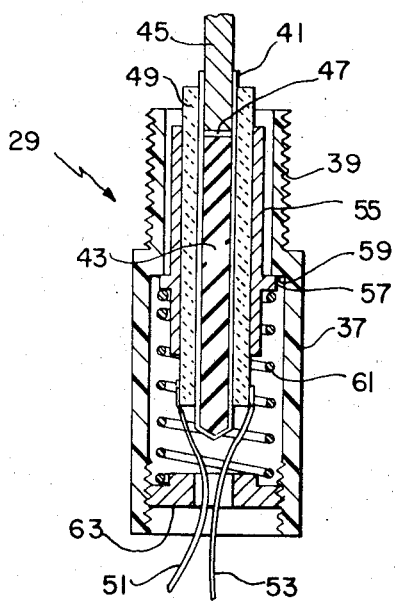
FIG. 3 is a sectional view of a solid-fill thermal expansion actuator employed in the control of FIGS. 1 and 2.

Actuator 29 is illustrated in greater detail in FIG. 3 and is constructed within a hollow nylon bushing 37 which is exteriorly threaded as indicated at 39 for mounting on the housing of the gas valve 25. The actuator includes a thin-walled steel tubular container 41 which is open at one end and closed at the other. Container 41 is partially filled with a mass of material 43 having a relatively high temperature coefficient of expansion, e.g., silicone rubber, and an operating member or plunger 45 fits within the open end of tube 41, the escape of the filling material 43 around plunger 45 being prevented by a seal 47. Tubular container 41 is mounted within a tubular heater 49 which comprises means for heating the mass of material 43. Heater 49 may, for example, be of the self-regulating or limiting type disclosed in copending application Ser. No. 435,165 filed Feb. 25, 1965. Such heaters comprise a mass of a semiconductor thermistor material having a resistance characteristic which has a positive temperature coefficient and a relatively sharply defined transition temperature above which the resistance of the material rises abruptly. A pair of leads 51 and 53 are attached to heater 49 for applying heating current thereto. At temperatures below the transition temperature, the heat produced by heater 49 varies substantially as a function of the voltage applied thereto but the temperature which can be reached is limited by the increase of resistance at the transition temperature thereby protecting the mass of material 43 from overheating and the actuator from exceeding its desired maximum stroke.

Heater 49 is mounted within a tubular sleeve 55 having a rim 57 which is urged against a mating internal shoulder 59 in the bushing 37 by a helical spring 61. The pressure exerted by spring 61 may be adjusted by means of an apertured cap 65 which is threaded into the end of bushing 33 opposite the operating plunger 45.

Actuator 29 operates in the following manner. When an electric current is applied through leads 51 and 53, resistance heating within the heater 49 heats the tubular container 41 and the mass of material 43 contained therein. Since the material 43 has a much higher temperature coefficient of expansion than the steel of the tubular container 41, the plunger 45 is pushed further out of the container, the travel of the plunger with respect to the container 41 being a substantially monotonic or single-valued function of the energization of the heater. Movement of the plunger 45 adjusts the output pressure of the valve 25 as described previously. When the force exerted by the plunger 45 on the operating member of the valve 25 reaches a preselected limit determined by the pressure exerted by the spring 61, further expansion of the mass of material 43 merely causes the rim 57 of sleeve 55 to lift from the shoulder 59 of the bushing 37 rather than to produce further displacement of the plunger 45 with respect to the bushing 37 and the valve 25. Thus a maximum or limiting value of gas pressure is obtained independently of the control circuit 35.

Figure 2:
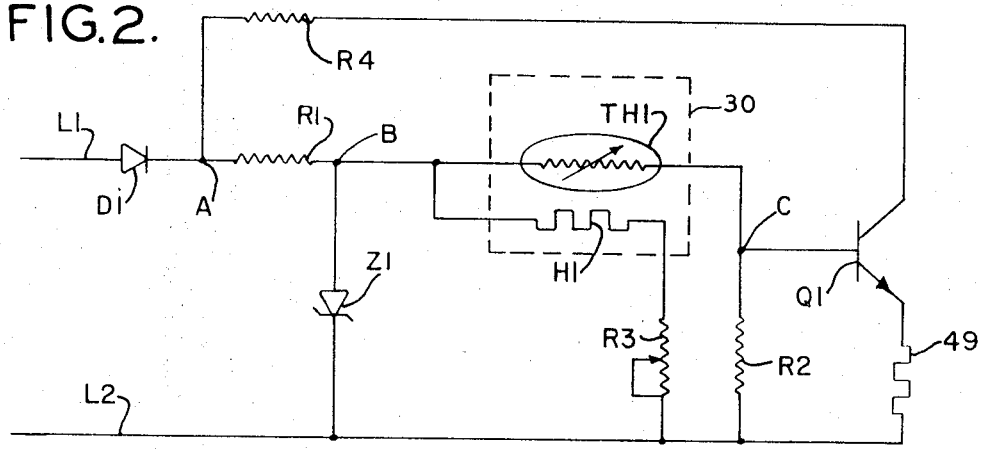
FIG. 2 is a schematic circuit diagram of the temperature control.

Referring now to FIG. 2, alternating current at a voltage suitable for transistor circuitry, e.g., 24 volts, is provided to the circuit through a pair of supply leads L1 and L2. This alternating current is rectified by a diode D1 to provide pulsating direct current at a point A within the circuit. This pulsating direct current is applied, through a current limiting resistor R1, to a zener diode Z1 which clips or limits the rectified halfwave rectified current to a predetermined level at a point B, which level is relatively independent of line voltage variations.

Thermistor TH1 is connected in series with a load resistor R2 across zener diode D1 to provide, at a point C within the circuit, a voltage which varies as a function of the temperature of the thermistor. Heater H1 is connected in series with a rheostat R3 across zener diode Z1 thereby to provide to thermistor TH1 an amount of biasing heat which can be varied by adjusting the setting of the rheostat.

The temperature-variable voltage provided at point C is applied to the base terminal of an NPN transistor Q1 which is operated as an emitter follower. The collector of transistor Q1 is connected to the pulsating DC source constituted by the point A through a current limiting resistor R4. The actuator heater 49 is connected between common lead L2 and the emitter of the transistor Q1. As is understood by those skilled in the art, transistor Q1 operates as a semiconductor power amplifier to apply to the heater 49 a voltage which is substantially equal to the temperature-responsive voltage provided at the point C. The voltage available at the emitter of transistor Q1 is, however, available at a lower impedance or higher power level.

The operation of this control is substantially as follows. If the ambient temperature in the zone 21 starts to fall below its normal or desired level, the resistance of thermistor TH1 decreases and an increased voltage is produced across the load resistor R2 at the point C. This raised voltage level is applied, at an increased current level, to the actuator heater 49 which increases the temperature of the material 43 and causes a further displacement of the plunger 45. This movement increases the gas output pressure from valve 25 and thus also increases the gas flow to and heat produced by the burner 13.

Accordingly, hotter air is provided from the heat exchanger 15 to the zone 21 thereby tending to raise its temperature and counteract the incipient drop in temperature which produced the initial decrease in the resistance of the thermistor. As may be seen from the foregoing explanation, the amount of additional heat which is applied to the zone 21 varies as a monotonic or single-valued function of the resistance of the thermistor TH1 and thus stable, proportional control is exercised over the temperature in the zone and the temperature within the zone does not continually deviate or hunt about the desired temperature. The particular temperature at which this controlled equilibrium is obtained can be adjusted by varying the amount of bias heat applied to thermistor TH1 by the heater H1. Rheostat R3 thus provides a convenient and simple continuously variable means for preselecting the thermal bias provided by heater H1 and thereby adjusting the temperature within the controlled zone. Furthermore, this adjustment control can be placed apart from the thermostat 30 so as to provide remote control of the zone temperature.

Temperature adjustment by means of the application of bias heat is particularly advantageous when the sensing thermistor TH1 is constructed of a semiconductor material which has a relatively sharply defined transition temperature above which the resistance or conductivity of the material changes abruptly. Thermistors constructed of such materials provide high sensitivity or gain when operated in the region of the transition temperature. By applying a variable bias heat to such a thermistor, the thermistor can be operated in the transition region while being responsive to an ambient temperature which is substantially below the transition region. Further, by varying the amount of the bias heat, the level at which the ambient temperature is controlled can be varied even though the sensing thermistor is operated at the high gain transition temperature which is inherently fixed by the composition of the thermistor.

While, in the embodiments illustrated, the valve means has been shown as varying fuel flow in a heating system, similar valve means may be provided for controlling the flow of a gaseous refrigerant fluid or a liquid coolant to maintain a preselected temperature in a zone in which heat must be abstracted rather than added to maintain the desired temperature. Thus, the flow of heat relative to the zone, i.e., supplied to or removed from, is controlled in accordance with this invention to maintain the zone temperature at a predetermined level.

Figure 4:
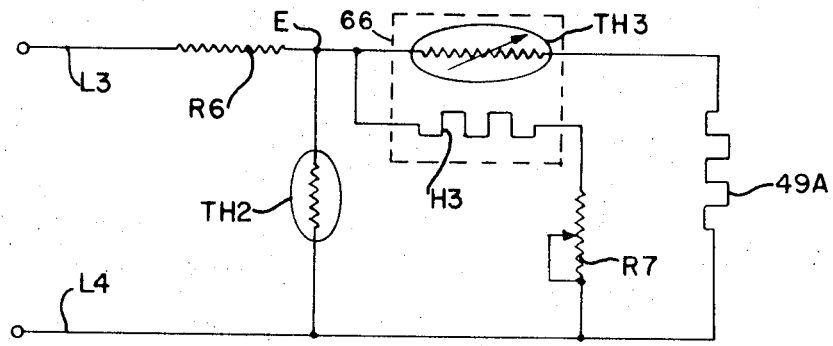
FIG. 4 is a schematic circuit diagram of an alternate construction of a temperature control of this invention.

Since relatively large amounts of force can be obtained from an actuator as that shown in FIG. 3 and since the displacement of the operating member or plunger depends upon the temperature of the expanding material rather than upon the power applied thereto, it can be seen that such an actuator can operate at extremely low power levels, particularly if the actuator is thermally insulated so that heat loss to the environment is minimized to a level consonant with the range of control and speed of response required. By employing such a low-power actuator and by using a sensing thermistor of appreciable power dissipating capacity, it is possible to operate the actuator directly from the sensing thermistor without using power amplification such as that provided by the transistor Q1 in FIG. 2. Such a directly operated construction is shown in FIG. 4. Alternating current from a pair of supply leads L3 and L4 is applied, through a dropping resistor R6, to a self-heating NTC thermistor TH2 to provide at a point E a voltage which is relatively stable with respect to line voltage and ambient temperature variations. A PTC sensing thermistor TH3 and an actuator heater 49A are connected in series across the voltage stabilizing thermistor TH2. A bias heater H3 and a rheostat R7 are also connected across this voltage source, this heater comprising means for applying a continuously variable thermal bias to sensing thermistor TH3. Sensing thermistor TH3 and heater H3 together comprise a solid state thermostat 66.

Figure 5:
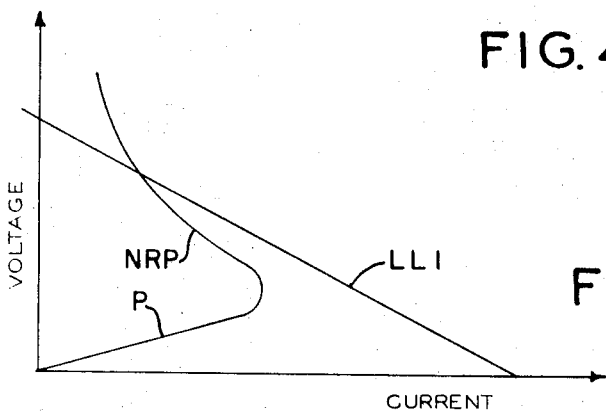
FIG. 5 is a graph representing the current-voltage characteristic of a thermistor employed in the FIG. 4 control in relation to an electrical load interconnected therewith.

PTC thermistor TH3 is preferably of the type mentioned previously having a resistance characteristic in which the resistance of the device rises relatively abruptly above a predetermined transition temperature PTC thermistors whose resistance-temperature characteristics have a steep slope, e.g., the thermistor TH3 above the transition temperature, possess a negative resistance characteristic under certain current, voltage and ambient conditions due to self-heating of the thermistor. In FIG. 5 the equilibrium current-voltage characteristic of such a thermistor is represented at P and, as may be seen, this curve has a negative resistance portion indicated at NRP. In order to provide a temperature control system having high loop gain without the use of conventional electronic amplifiers, this negative resistance characteristic of a self-heating thermistor is employed to obtain thermal regeneration or positive feedback. Such regeneration is obtained by choosing the source voltage and the load impedance, i.e., the resistance of the actuator heater 49A, so that the thermistor operates stably in the negative resistance region. In FIG. 5 the resistance of actuator heater 49A is represented by the load line LL1 which intersects the current-voltage characteristic P of the thermistor TH3 at a single point which is within the negative resistance region NRP. Since there is only a small difference in slope between the two curves at the point of intersection, it can be seen that even a slight change in the size or shape of the curve P will cause a substantial shift in the operating point designated by the intersection of the curves. As is understood by those skilled in the art, changes in the ambient temperature to which the thermistor TH3 is exposed will cause corresponding changes in the size of the equilibrium curve P and will thus produce substantial changes in the operating point and in the energization of the actuator heater 49A. Due to the self-heating of the thermistor TH3 and the regenerative effect which the self-heating has on the operating point of the system, small changes in the ambient temperature actually produce larger changes in the temperature of the thermistor. The overall effect of this thermal regeneration is to render the control more sensitive to changes in the ambient temperature so that a tighter control over that temperature is obtained. Such a solid-state thermostat can be employed in both heating and cooling systems.

Thermal regenerative feedback can also be produced by employing a temperature dependent element, such as an NTC thermistor, for the biasing heater H3. As is understood by those skilled in the art, the current-voltage characteristic of an NTC thermistor having a steeply sloped resistance-temperature characteristic will also have a negative resistance region. By connecting a bias heater having such an NTC characteristic in series with an electrical load (resistance R7 in FIG. 4) having an appropriate resistance in relation to the source voltage, thermal regeneration is obtained in which a small change in the ambient temperature causes a large change in the temperature of the heater. As the heater is thermally coupled to or biases the sensing thermistor TH3, such large temperature swings of the heater augment changes in the resistance of the sensing thermistor thereby increasing the loop gain of the temperature control system.

Figure 6:
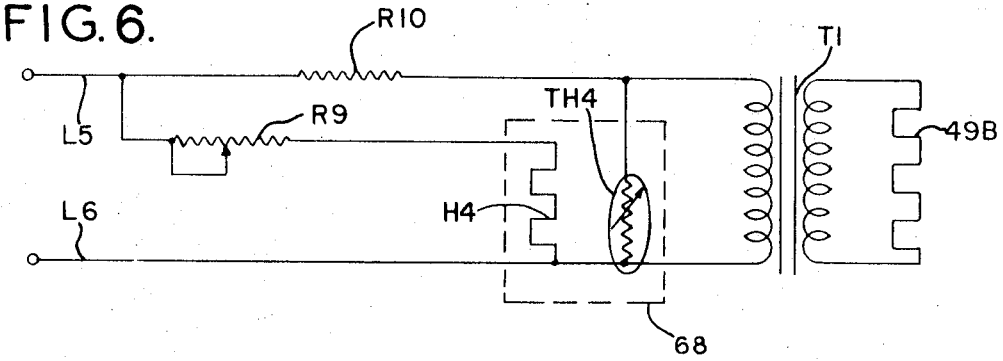
FIG. 6 is a schematic circuit diagram of another possible construction of a temperature control of this invention.

In FIG. 6 there is illustrated a control which is in a sense complementary in operation to the control of FIG. 4. An NTC sensing thermistor TH4 is used instead of the PTC sensing thermistor of FIG. 4 and the operating load, e.g., the actuator heater 49B, is connected essentially across the sensing thermistor TH4 (by means of an impedance matching transformer T1) rather than in series therewith as in the FIG. 4 embodiment.

AC power is provided at a pair of supply leads L5 and L6. A bias heater H4 is connected across this source through a rheostat R9 and is thermally coupled to sensing thermistor TH4 for applying a continuously variable preselected thermal bias thereto. Thermistor TH4 and heater H4 together comprise a solid-state thermostat 68. Sensing thermistor TH4 is connected across leads L5 and L6 through a resistor R10. The primary winding of transformer T1 is connected across thermistor TH4 and its secondary winding is connected to actuator heater 49B for applying thereto a voltage which is substantially proportional to the voltage which is generated across thermistor TH4.

Figure 7:
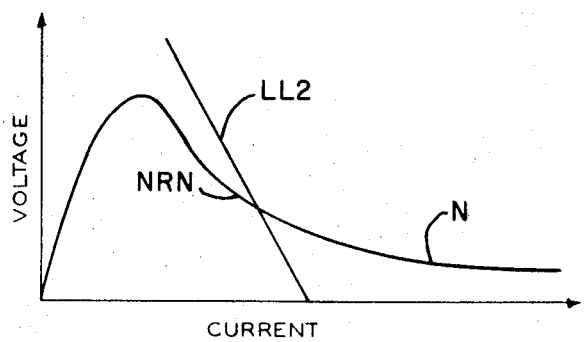
FIG. 7 is a graph representing the current-voltage characteristic of a thermistor employed in the FIG. 6 control in relation to an electrical load interconnected therewith.

The current-voltage characteristic of NTC thermistor TH4 is represented at N in FIG. 7 and has a negative resistance portion as indicated at NRN. The value of resistor R10 is selected so that sensing thermistor TH4 operates at a stable equilibrium within the negative resistance region of its current-voltage characteristic as is indicated by the single intersection of a load line LL2 (which represents the resistance of resistor R10) with the curve N.

When the ambient temperature to which the sensing thermistor TH4 is exposed begins to drop, the resulting increase in the resistance of the thermistor causes an increased voltage to be applied across the actuator heater which in turn causes an increase in gas flow and heat production as in the embodiment of FIG. 1. In this way temperature variations are counteracted and the temperature in the controlled zone is maintained at a preselected level. The preselected level may be varied by adjusting the setting of the rheostat R9 which controls the thermal bias applied to the sensing thermistor. As in the FIG. 4 embodiment, thermal regeneration is produced by operating the thermistor in its negative resistance region thereby providing increased control loop gain.

In the embodiment illustrated in FIG. 8, the average energization of an actuator heater 49C is varied by varying the duty cycle and amplitude swing of an electrothermal oscillator 73. Oscillator 73 comprises a PTC thermistor TH5 connected in series with an NTC thermistor TH6. Both thermistors are chosen to possess resistance characteristics having regions of relatively high slope so that the current-voltage characteristic of each has a negative resistance region. As is understood by those skilled in the art, when a pair of such thermistors are connected in series across a voltage source, oscillations are obtained since as one thermistor self-heats toward an equilibrium condition, it disturbs the equilibrium of the other, this cycling continuing in an oscillatory manner. The frequency and amplitude of oscillations vary as a function of the voltage applied to the oscillator.

Oscillator 73 and actuator heater 49C are connected in a series circuit with a PTC sensing thermistor TH7 and a rheostat R11 across a pair of supply leads L7 and L8 to which a substantially constant voltage, either AC or DC is applied. As the voltage applied to the oscillator 73 varies as a function of the combined resistances of the rheostat R11 and the thermistor TH7, it can be seen that the character of the oscillations will vary as a function of the ambient temperature to which the thermistor TH7 is exposed. At relatively high temperatures only relatively low voltage is applied to oscillator 73 and its oscillations will be relatively rapid and of small amplitude as represented in FIG. 9A. However, at lower temperatures a higher voltage is applied to the oscillator 73 and its oscillations will be at a lower repetition rate but of higher amplitude as represented in FIG. 9B. As may be seen by comparing FIGS. 9A and 9B, the oscillations represented in FIG. 9B have a higher energy content than those represented in FIG. 9A and thus the energization of the actuator heater 49C is increased. Assuming that, as in the embodiment of FIG. 1, increased energization of the actuator heater produces more heat from the furnace or other heat source, it can be seen that temperature-controlling feedback operation is obtained.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:
  1. A temperature control comprising:
    means for providing heat flow relative to a zone at a rate which is variable over a continuous range;
    an electrical load;

means responsive to the energization of said load for varying said rate.

an electrothermal oscillator for variably energizing said load; and a sensing thermistor responsive to the temperature in said zone for varying the operation of said oscillator thereby to maintain the temperature in said zone at a predetermined level.

2. A temperature control as set forth in claim 1 wherein said oscillator comprises first and second thermistor elements having positive and negative temperature coefficients of resistance respectively.

3. A temperature control as set forth in claim 2 wherein said sensing thermistor, said first and second thermistor elements, and said load are connected in series across a source providing a substantially constant voltage.

4. A temperature control as set forth in claim 3 wherein said electrical load comprises a heater in an electrically energized thermal expansion actuator.

5. A temperature control as set forth in claim 2 wherein each of said first and second thermistor elements has a current-voltage characteristic which includes a negative resistance region.

6. A temperature control as set forth in claim 1 in which said sensing thermistor has a positive temperature coefficient of resistance.